May 18, 1971 N. E. ALBER ET AL Re. 27,123
EXTRUDING FIBERS HAVING OXIDE SKINS
Original Filed April 30, 1962
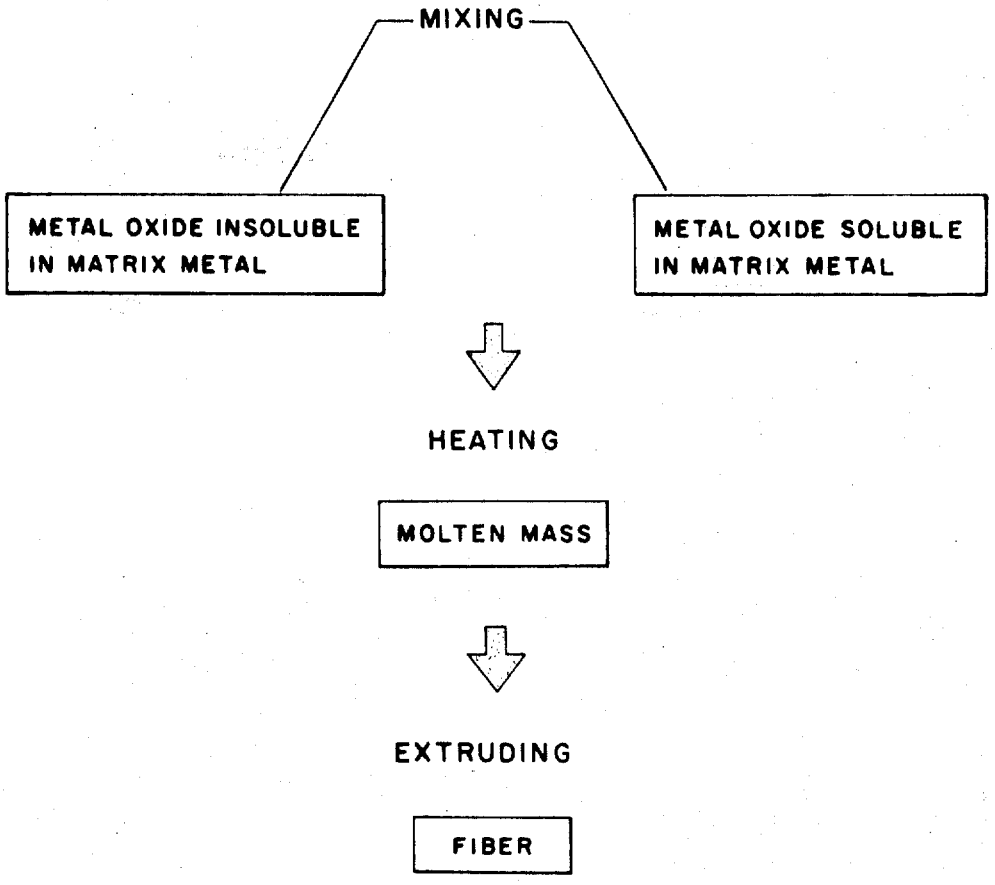
INVENTORS
NORMAN E. ALBER
WALTER E. SMITH
BY Edward S. Sachs
ATTORNEY United States Patent Office Re. 27,123
Reissued May 18, 1971

27,123

EXTRUDING FIBERS HAVING OXIDE SKINS

Norman E. Alber, Mentor, Ohio, and Walter E. Smith, Hingham, Mass., assignors to Clevite Corporation Original No. 3,216,076, dated Nov. 9, 1965, Ser. No. 191,340, Apr. 30, 1962. Application for reissue May 26, 1969, Ser. No. 835,867
Int. Cl. B22d *11/00*
U.S. Cl. 164—86 8 Claims

Matter enclosed in heavy brackets [ ] appears in the original patent but forms no part of this reissue specification; matter printed in italics indicates the additions made by reissue.

*ABSTRACT OF THE DISCLOSURE*

*Metallic fibers and filaments made by extrusion of certain molten alloys into air, said alloys containing a major portion of a metal the oxide of which is soluble in the melt and a minor portion of a metal the oxide of which is insoluble in the melt. The oxide skin formed by extrusion into air stabilizes the molten jet pending solidification.*

*This application is an application for reissue of U.S. Pat. No. 3,216,076.*

This invention relates to metal alloy fibers and filaments and more particularly to a method of producing such fibers and filaments.

Metal fibers and filaments are commonly formed by extruding a continuous stream of molten metal through a small orifice and impinging the stream on a rotating plate or chill block. While mention has been made of the production of filaments of virtually all non-refractory metals by means of hot melt extrusion, in actual practice only a small number of non-alloyed metals will yield a filament by this process.

Attempts to produce filaments from metals whose oxides are substantially soluble in the non-oxidized molten metal have resulted in the formation of small spheres or powder. To form a metal filament by direct casting the stream of molten metal must hold its shape or contour long enough to become solid. A metal which does not have the physical characteristics to achieve this prerequisite cannot produce a filament.

It is therefore an object of this invention to provide a method for the production of metal filaments from metal compositions containing major portions of non-refractory metals whose oxides are substantially soluble in the molten metal itself.

It is another object of this invention to provide fibers and filaments of metal alloys containing as a major component a metal whose oxide is substantially soluble in the molten metal itself.

[We have now discovered that it is possible to produce filaments from non-refractory metals whose oxides are substantially soluble in the non-oxidized molten metal by alloying therewith a minor percentage of a compatible metal whose oxide is substantially insoluble in the non-oxidized molten metal. Filaments may then be formed from the alloyed metal by a simple extrusion process which is not dependent on external cooling methods. While the process of this invention is suitable in general for non-refractory metals whose oxides are substantially soluble in the molten metal itself, the group consisting of copper, silver, gold, platinum, iron, nickel, germanium, indium, cobalt, manganese and combinations thereof have been found to be particularly suitable. Any compatible non-refractory metal having an oxide which is substantially insoluble in the metal itself is suitable for purposes of the invention. However, a metal selected from a group consisting of aluminum, magnesium, beryllium, chromium, lanthanum and combinations thereof have been found to be particularly suitable. It should be understood that the phrase "compatible non-refractory metal" as used herein means a metal or combination of metals having the ability to form an alloy.]

*We have now discovered that it is possible to produce filaments from certain alloys. These are alloys of one or more non-refractory metals whose oxides are substantially soluble in the non-oxidized molten metal and a minor percentage of one or more compatible metals whose oxides are substantially insoluble in the non-oxidized molten metal. Filaments may then be formed from the alloyed metal by a simple extrusion process which is not dependent on external cooling methods. Filaments may be produced from metals of the group consisting of copper, silver, gold, platinum, iron, nickel, germanium, indium, cobalt, manganese and combinations thereof. A metal selected from the group consisting of aluminum, magnesium, beryllium, chromium, lanthanum and combinations thereof has been found to be suitable as a metal having an oxide which is substantially insoluble in the metal itself. It should be understood that the phrase "compatible non-refractory metal" as used herein means a metal or combination of metals having the ability to form an alloy.*

In the art of filament formation by means of hot melt extrusion there are many factors which may influence the behavior of the melt after it leaves the orifice. Influencing factors may be (1) friction created by the surrounding media, (2) the surface tension of the liquid material, (3) the flow [patern] *pattern* it had assumed on leaving the orifice. The surrounding media and flow pattern can be controlled, but the surface tension is always exerting a force towards a change of shape to a spherical condition. It has now been found that the surface tension can be lessened by the presence of an oxide film. The film gives the effect of a lubricant surrounding the liquid and containing it in its shape until the liquid solidifies. For the formation of metal filaments by extruding molten metal through an orifice it is therefore necessary that the metal have the property of forming a stable oxide which adheres to the filament surface. In metals which do not have this property, small additions of an alloying metal which will produce the stable oxide must be added before a filament can be produced. The metal which will produce a stable oxide should be present in amounts in excess of 0.5% by weight of the alloy. The upper limit on the quantity of metal which will produce a stable oxide is only determined by the physical characteristics desired in the finished fiber. The orifice size employed has an upper limit of about 20 mils in diameter. The minimum orifice size is determined by the strength of the crucible and the ability to drill an opening the diameter of which approaches minimum dimensions.

In the drawing there is shown a single figure diagrammatically illustrating the method of producing fibers in accordance with this invention.

The following examples are given for purposes of illustration and should not be considered as limiting the spirit or scope of the invention.

Example I.—An aluminum oxide crucible with a 0.002" orifice was charged with quantities of molten copper metal varying from amounts of two grams to seven grams. The molten stream of pure copper was found to break up prior to solidification. Initially the high ejection rates were thought to cause the stream to break up. A system was therefore devised so that pressure could be reduced once flow was initiated. This system provided a continuous distribution of ejection velocities. However, the stream of pure molten copper continued to break up prior to solidification. To increase the break up length 10 weight percent of aluminum was added to the copper, thereby forming an oxide skin when the jet came in contact with air. The oxide skin, formed on the alloy consisting of 10% aluminum and 90% copper, resulted in a stabilization of the jet and continuous fibers were produced.

Example II—An aluminum oxide crucible with a .005 inch orifice was charged with 31.78 grams of silver and .318 gram of aluminum. The charge was ejected at a temperature of 100° C. at a pressure of 40 p.s.i. The result was the formation of an oxide skin on the alloy consisting of 99% silver and 1% aluminum. The oxide skin increased the break up length of the melt and thereby allowed the formation of silver alloy filaments.

While extrusion pressures and melt temperatures are important variable in the formation of a filament, it should be understood that adjustment of these variable to optimum conditions is within the ability of a skilled operator. The discussion of filament formation is therefore centered on the proper formation of a melt containing an oxide which is substantially insoluble in the molten metal itself.

Liquid jet theory predicts that at very high velocities the liquid issues from the orifice at high enough energy or inertia so as not to allow marked oscillations which characterize the lower speed regions. Instead, however, break up occurs because of two fluids inter-penetrating at the surface of the liquid jet. From observation of liquid jets the inter-penetration takes place not in the form of continuous diffusion but by the air or atmosphere forming bubbles within the liquid and the liquid erupting from the surface of the liquid jet. Once the penetration is established the bulk of the liquid jet rapidly disintegrates. Some of the whipping action is still present but the jet is disintegrated piece by piece by friction with air along its periphery. This is also aided by turbulence in the stream.

If a skin is formed along the periphery of the jet the interaction between the fluid and air will greatly be reduced. Larger forces are also necessary to collapse the cylindrical jet since the varicose effect will be reduced. Adding elements which have the ability to form oxide skin therefore stabilizes the molten jets. The oxide skin may also act as nucleation sites and therefore prohibit homogeneous nucleation.

The formation of oxide skins necessitates the ejection of the melt into the atmosphere or into an oxygen containing medium rather than into a vacuum. Ideally a vacuum would prevent the sinusoidal or whip-like motion caused by the backing up of the continuous stream due to air resistance. It has been demonstrated, however, that air resistance can be partially overcome. This is accomplished with jet air streams which counterbalance the air resistance and therefore aid in both the production of an oxide film and the elimination of sinusoidal or whip-like motions.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What we claim is:

1. The method of producing fibers and filaments comprising: extruding a continuous stream of molten [metal] *alloy* through an orifice *into a reactive, oxide skin-forming atmosphere*, said [metal being an] alloy consisting essentially of a *major portion of a* non-refractory first metal whose oxide is substantially soluble in the non-oxidized *alloy* [metallic mass], *said first metal being selected from the group consisting of gold, silver, platinum, iron, nickel, germanium, indium, cobalt, manganese, and combinations thereof*, and of a compatible non-refractory second metal whose oxide is substantially insoluble in *said* [the] molten *alloy* [mass], *said* [the] second metal being present in [an] *a minor* amount effective to *form a filament or fiber stabilizing* [provide an] oxide skin on *said molten alloy* [the first metal].

[2. The method of claim 1 wherein said first metal is selected from the group consisting of copper, silver, gold, platinum, iron, nickel, germanium, indium, cobalt, manganese and combinations thereof.]

[3. The method of claim 1 wherein said second metal is selected from the group consisting of aluminum, magnesium, beryllium, chromium, lanthanum and combinations thereof.]

4. The method of claim 1 wherein said second metal [is] *constitutes* in excess of 0.5% by weight of the alloy.

5. The method of producing fibers and filaments comprising extruding a continuous stream of molten *alloy* [metal] through an orifice *into a reactive oxide skin-forming atmosphere*, said [metal being an] alloy consisting essentially of a *major portion of a* non-refractory first metal selected from the group consisting of [copper,] silver, gold, platinum, iron, nickel, germanium, indium, cobalt, manganese and combinations thereof and of a compatible *minor portion of a* non-refractory second metal selected from the group consisting of aluminum, magnesium, beryllium, chromium, lanthanum and combinations thereof, said second metal being present in an amount effective to *form a filament or fiber stabilizing* [provide an] oxide skin on *said molten alloy* [the first metal].

*6. The method of producing fibers and filaments comprising extruding a continuous molten stream of an alloy consisting essentially of iron and aluminum through an orifice into an oxygen containing atmosphere, said alloy containing a major portion of iron, said aluminum being at least 0.5% by weight of the alloy to form a filament or fiber stabilizing oxide skin on said molten alloy.*

*7. The method of producing fibers and filaments comprising: extruding a continuous stream of molten alloy through an orifice into a reactive, oxide skin-forming atmosphere, said alloy consisting essentially of a major portion of a non-refractory first metal whose oxide is substantially soluble in the non-oxidized alloy, and of a compatible minor portion of a non-refractory second metal whose oxide is substantially insoluble in the molten alloy, the second metal being persent in an amount effective to form a filament or fiber stabilizing oxide skin on the alloy and being selected from the group consisting of aluminum, magnesium, beryllium, chromium, lanthanum and combinations thereof.*

*8. The method of producing fibers and filaments comprising extruding a continuous stream of molten alloy through an orifice into a reactive oxide skin-forming atmosphere, said alloy consisting essentially of a major portion of iron and a different compatible non-refractory metal whose oxide is substantially insoluble in the molten alloy, said different compatible non-refractory metal being present in an amount effective to form a filament or fiber stabilizing oxide skin on the stream of molten alloy.*

*9. The method of claim 8 wherein the said different compatible non-refractory metal is aluminum.*

*10. The method of producing fibers and filaments comprising: extruding a continuous stream of molten alloy through an orifice into a reactive, oxide skin-forming atmosphere, said alloy consisting essentially of a major por-*

*tion of a non-refractory first metal whose oxide is substantially soluble in the non-oxidized alloy, said first metal being selected from the group consisting of gold, platinum, iron, nickel, germanium, indium, cobalt, manganese, and combinations thereof, and of a compatible minor portion of a non-refractory second metal whose oxide is substantially insoluble in the molten alloy, the second metal being present in an amount effective to form a filament or fiber stabilizing oxide skin on the molten alloy.*

References Cited

UNITED STATES PATENTS

The following references, cited by the Examiner, are of record in the patented file of this patent or the original patent.

| | | | |
|---|---|---|---|
| 2,825,108 | 3/1958 | Pond | 18—2.6X |
| 2,879,566 | 3/1959 | Pond | 164—81X |
| 2,907,082 | 10/1959 | Pond | 164—89X |
| 2,304,258 | 12/1942 | Junghans | 22—200.1 |
| 2,609,598 | 9/1942 | Mason | 75—171 |
| 2,731,343 | 1/1956 | Dunn | 75—162 |
| 2,829,972 | 4/1958 | Klement | 75—162 |
| 2,873,187 | 2/1959 | Dynkacz et al. | 75—124 |
| 2,944,890 | 7/1960 | Klement | 75—162 |
| 2,976,590 | 3/1961 | Pond | 22—200.1 |

FOREIGN PATENTS

| | | |
|---|---|---|
| 387,971 | 2/1933 | Great Britain. |
| 476,115 | 12/1937 | Great Britain. |
| 790,303 | 2/1958 | Great Britain. |

J. SPENCER OVERHOLSER, Primary Examiner

R. S. ANNEAR, Assistant Examiner

U.S. Cl. X.R.

164—58, 82